United States Patent [19]
Suzuki

[11] Patent Number: 5,927,331
[45] Date of Patent: Jul. 27, 1999

[54] FLOW CONTROL VALVE

[75] Inventor: Isao Suzuki, Tokyo, Japan

[73] Assignee: MKS Japan, Inc., Tokyo, Japan

[21] Appl. No.: 08/714,600

[22] Filed: Sep. 16, 1996

Related U.S. Application Data

[62] Division of application No. 08/539,744, Oct. 5, 1995, Pat. No. 5,582,208.

[30] Foreign Application Priority Data

Oct. 6, 1994  [JP]  Japan .................................. 6-266077

[51] Int. Cl.⁶ ....................................................... F16K 1/42
[52] U.S. Cl. ...................................... 137/625.33; 251/282
[58] Field of Search ......................... 137/625.29, 625.33; 251/282

[56] References Cited

U.S. PATENT DOCUMENTS

| | | |
|---|---|---|
| 3,219,063 | 11/1965 | Schumann et al. . |
| 4,666,126 | 5/1987 | Tujimura et al. . |
| 4,679,585 | 7/1987 | Ewing . |
| 4,695,034 | 9/1987 | Shimizu et al. . |
| 5,251,871 | 10/1993 | Suzuki . |

*Primary Examiner*—John Fox
*Attorney, Agent, or Firm*—Wenderoth, Lind & Ponack, LLP

[57] ABSTRACT

A flow control valve includes a valve member mounted in a valve chamber having an inlet port, through which a fluid flows into the valve chamber, and an outlet port through which the fluid flows out of the valve chamber. The valve member is slidable in the valve chamber in response to a driving force applied from an actuator. Valve seat member is mounted in the valve chamber in opposed relation to the valve member, the valve seat member cooperating with the valve member to control a rate of flow of the fluid. The valve seat member has at least a first hole formed therein and extending in a direction of driving of the valve member, a second hole formed therein and extending from an outer peripheral surface thereof and a third hole which is separated from the first hole and extends from its surface facing the valve member to the second hole in a direction of driving of the valve member, the second hole extending in a direction substantially perpendicular to the direction of driving of the valve member. A gap is provided in the valve chamber, so that when the valve member is disengaged from the valve seat member, there are formed a first flow passage, through which the fluid flows from the inlet port to the outlet port via the first holes, and a second flow passage through which the fluid flows from the inlet port to the outlet port via the first, the second and the third holes.

10 Claims, 10 Drawing Sheets

FLOW CONTROL VALVE

This is a divisional application of Ser. No. 08/539,744, filed Oct. 5, 1995, now U.S. Pat. No. 5,582,208.

BACKGROUND OF THE INVENTION

1. Field of the Invention

This invention relates generally to a flow control valve for controlling the rate of flow of a gas used, for example, in the manufacture of semiconductors, and more particularly to a flow control valve suitable for use in a flow control system employing a piezoelectric actuator.

2. Description of the Related Art

Recently, in flow control valves of the type mentioned, a piezoelectric actuator has been used since it can finely control the flow rate. However, a piezoelectric actuator has a drawback in that the stroke is small, and therefore it has been difficult to obtain a flow control valve having a compact size and a large flow rate.

Therefore, projections of a complicated shape have heretofore been formed on a surface of a valve member and a valve seat member so as to achieve a large flow rate. Flow control valves employing such a construction are disclosed, for example, in Japanese Patent Public Disclosure Nos. 2-116071, 5-99349 and 62-24088.

However, these conventional flow control valves have problems that a valve member and other parts are complicated in construction, that the machining of these parts into their required configuration is rather difficult, that a great amount of time is required for their manufacture, and that the yield rate is low. Besides which, because of the complicated construction of the valve member and other parts, there has been encountered another problem that stresses are liable to develop, and therefore the working life of the valve is rather short, and a precisely closed condition of the valve can not be obtained.

SUMMARY OF THE INVENTION

With the above problems of the conventional flow control valves in view, it is an object of this invention to provide a flow control valve which is simple in construction, can provide a large flow rate, is simple in machining, requires less time for manufacture, and can achieve a high yield rate.

Another object of the invention is to provide a flow control valve which has a long working life, and can achieve precise closure of the valve.

According to a first aspect of the present invention, there is provided a flow control valve comprising:

a valve member mounted in a valve chamber having an inlet port, through which a fluid flows into the valve chamber, and an outlet port through which the fluid flows out of the valve chamber, the valve member being slidable in response to a driving force applied from an actuator; and a valve seat member mounted in the valve chamber in opposed relation to the valve member, the valve seat member cooperating with the valve member to control a rate of flow of the fluid;

wherein the valve seat member has at least a first hole formed therethrough and extending in a direction of driving of the valve member, at least a second hole formed therein and extending from an outer peripheral surface thereof, and a third hole which is separated from the first hole and extends from a surface of the valva seat facing the valve member to the second hole in a direction of driving of the valve member, the second hole extending in a direction substantially perpendicular to the direction of driving of the valve member; and wherein a gap is provided in the valve chamber, so that when the valve member is disengaged from the valve seat member, there are formed a first flow passage, through which the fluid flows from the inlet port to the outlet port via the first hole, and a second flow passage through which the fluid flows from the inlet port to the outlet port via the first, third and second holes.

In a flow control valve of a feature of the invention, projections are formed on the surface of the valve member facing the valve seat member, the projections interrupting the communication between the first hole and the second hole in a closed condition of the valve.

The said surface of the valve member facing the valve seat member can be flat with the projections provided on the surface of the valve seat member facing the valve member.

According to another aspect of the invention there is provided a flow control valve comprising:

a valve member mounted in a valve chamber having an inlet port, through which a fluid flows into the valve chamber, and an outlet port through which the fluid flows out of the valve chamber, the valve member being slidable in the valve chamber in response to a driving force applied from an actuator; and a valve seat member mounted in the valve chamber in opposed relation to the valve member, the valve seat member cooperating with the valve member to control a rate of flow of the fluid;

wherein the valve seat member has at least a through hole formed therethrough and extending in a direction of driving of the valve member, and the valve member has at least a through hole formed therethrough and extending in the direction of driving of the valve member; and wherein a gap is provided in the valve chamber, so that when the valve member is disengaged from the valve seat member, there are formed a flow passage, through which the fluid flows from the inlet port to the outlet port via the through hole in the valve seat member, and another flow passage through which the fluid flows from the inlet port to the outlet port via the through hole in the valve seat member and the through hole in the valve member.

Projections can be formed on the opposing surfaces of the valve seat member and/or the valve member, the projections interrupting the communication between the through hole in the valve seat member and the through hole in the valve member in a closed condition of the valve.

A diaphragm member which includes a diaphragm portion disposed at an actuator side, and a side wall extending from an outer peripheral portion of the diaphragm portion, the valve chamber being formed by an internal space of the diaphragm member.

The outlet port can extend in a direction substantially perpendicular to the direction of driving of the valve member.

In the flow control valve of the first aspect of the invention the valve seat member has at least a first hole formed therethrough and extending in the direction of driving of the valve member, at least a second hole formed therein and extending from the outer peripheral surface thereof, and a third hole which is separated from the first hole and extends from a surface of the valve seat member facing the valve member to the second hole in a direction of driving of the valve member, the second hole extending in a direction substantially perpendicular to the direction of driving of the valve member. The gap is provided in the valve chamber, so that when the valve member is disengaged from the valve seat member, there are formed the first flow passage, through which the fluid flows from the inlet port to the outlet port via the first hole, and the second flow passage through which the fluid flows from the inlet port to the outlet port via the first, third and second holes. With this construction, a large flow rate can be achieved.

When projections are formed on the surface of the valve member facing the valve seat member, such projections interrupt the communication between the first hole and the second hole in the closed condition of the valve, and the fluid flows past the projections when the valve is open. With this construction, a large flow rate can be achieved.

When the surface of the valve member facing the valve seat member is flat, the projections are provided on the surface of the valve seat member facing the valve member. Even with this simple construction, a large flow rate can be achieved.

In the flow control valve of the other aspect of the invention the valve seat member has at least a through hole formed therethrough and extending in the direction of driving of the valve member, and the valve member has at least a through hole formed therethrough and extending in the direction of driving of the valve member. The gap is provided in the valve chamber, so that when the valve member is disengaged from the valve seat member, there are formed the flow passage, through which the fluid flows from the inlet port to the outlet port via the through hole in the valve seat member, and the other flow passage through which the fluid flows from the inlet port to the outlet port via the through hole in the valve seat member and the through holes in the valve member. With this construction, a large flow rate can be achieved.

When projections are formed on the opposing surfaces of the valve seat member and/or the valve member, the projections interrupt the communication between the through hole in the valve seat member and the through hole in the valve member when the valve is closed, and the fluid flows past the projections when the valve is open. With this construction, a large flow rate can be achieved.

When the diaphragm member which includes the diaphragm is disposed at the actuator side and the side wall extending from the outer peripheral portion of the diaphragm portion, the space defining the valve chamber can be easily provided by the diaphragm member.

With the outlet port is provided in the direction substantially perpendicular to the direction of driving of the valve member the outlet port is thus provided in the direction perpendicular to the direction of movement of the valve member or the valve seat member, so that the fluid can easily flow out of the outlet port through the outer periphery of the valve member or the valve seat member.

DESCRIPTION OF THE PREFERRED EMBODIMENTS

Preferred embodiments of flow control valves of the present invention will now be described with reference to the accompanying drawings in which the same reference numerals denote identical parts, respectively, and repeated description of the same parts will be omitted.

Figure 1:
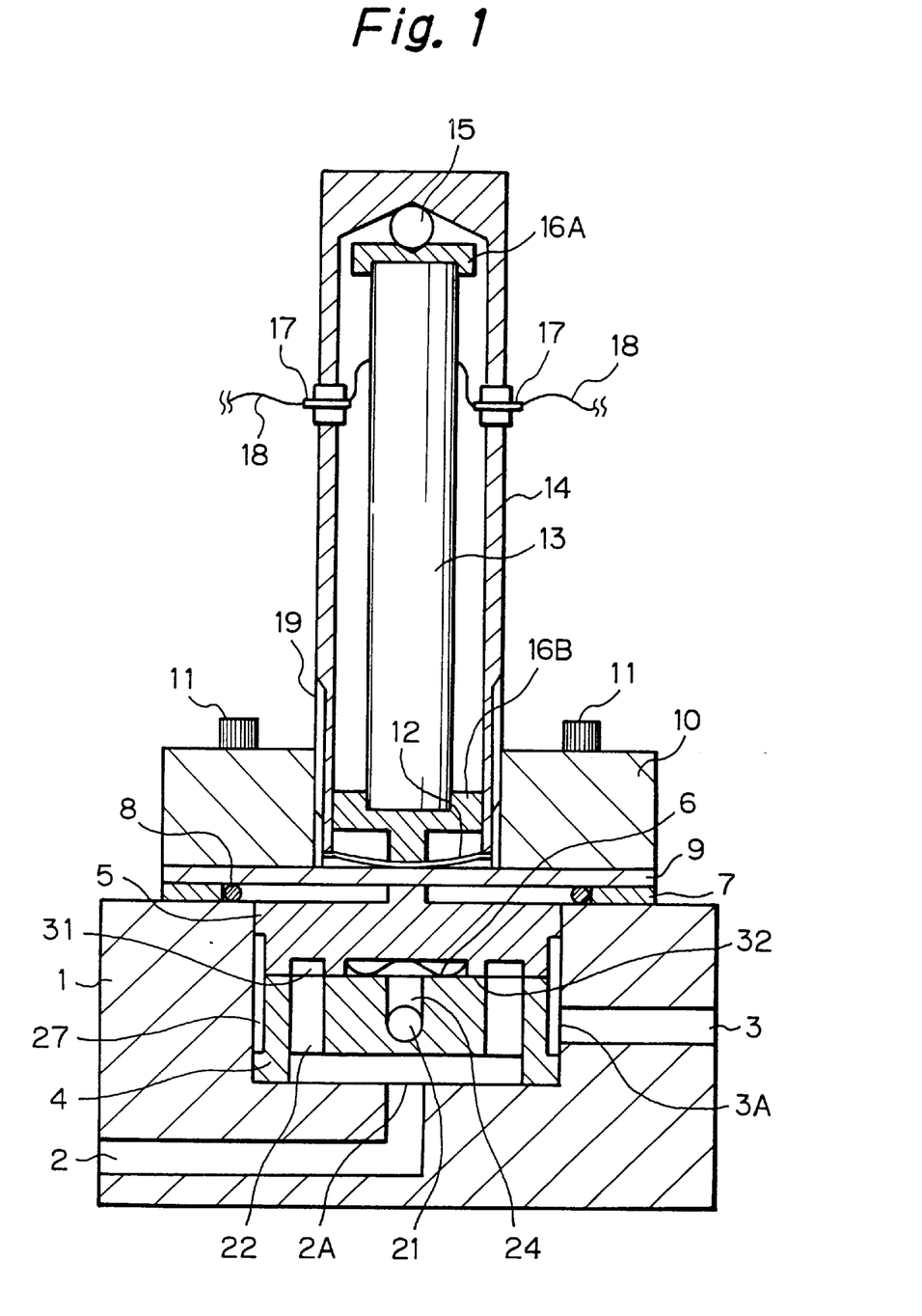
FIG. 1 is a cross-sectional view of a first embodiment of a flow control valve of the invention.

FIG. 1 shows a first embodiment of a flow control valve of the invention. In this embodiment, there is used a piezoelectric actuator 14. In the piezoelectric actuator 14, a piezoelectric stack 13 is housed in a tubular casing, and is held between upper and lower buffer members 16A and 16B, and the piezoelectric stack 13 is sealed in the tubular casing by a diaphragm 12. A steel positioning ball 15 is interposed between a top surface of an internal chamber of the tubular casing and the upper buffer member 16A, and holds the piezoelectric stack 13 in a vertical condition. The size of the outer periphery of the lower buffer member 16B is so determined that buffer member 16B is slidable along the tubular casing. The lower buffer member 16B has a projection formed on a lower surface thereof, and this projection is held against a central portion of the diaphragm 12. A pair of hermetic terminals 17 are mounted respectively at suitable portions of the tubular casing of the piezoelectric actuator 14, and electric power is supplied to the piezoelectric stack 13 through these terminals 17 and lead wires 18.

A base 1, having a valve chamber formed therein, has an inflow passage 2 and an outflow passage 3 for a fluid. A diaphragm 9 is fixedly secured through an O-ring guide 7 to an upper surface of the base 1 by bolts 11 mounted in a fixing ring 10. An O-ring 8 is interposed between the diaphragm 9 and the base 1, and is held in position by the O-ring guide 7.

A screw hole is formed through a central portion of the fixing ring 10, and a threaded portion 19 is formed on an outer peripheral surface of a lower portion of the tubular casing of the piezoelectric actuator 14. The piezoelectric actuator 14 is threaded into the screw hole in the fixing ring 10, and is held in an upstanding condition.

Figure 2:
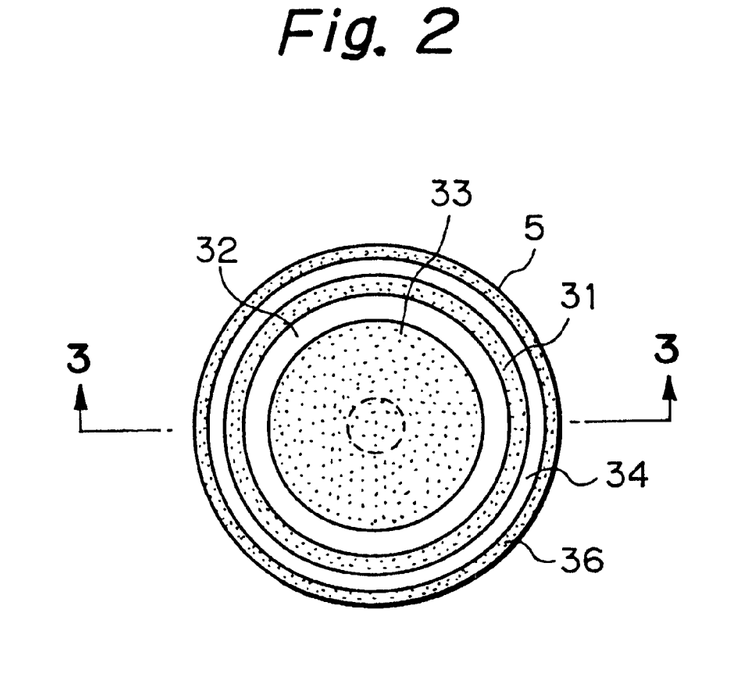
FIG. 2 is a bottom view of a valve member used in the flow control valve of FIG. 1.
Figure 3:
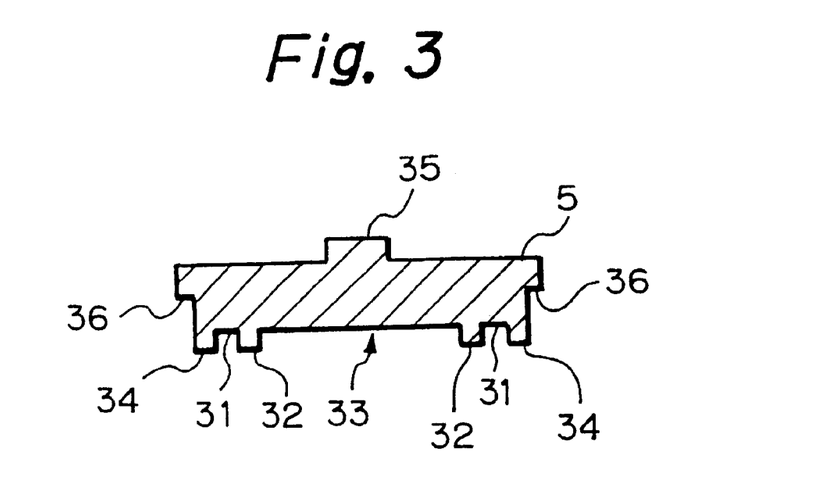
FIG. 3 is a cross-sectional view of the valve member taken along the line 3—3 of FIG. 2.
Figure 4:
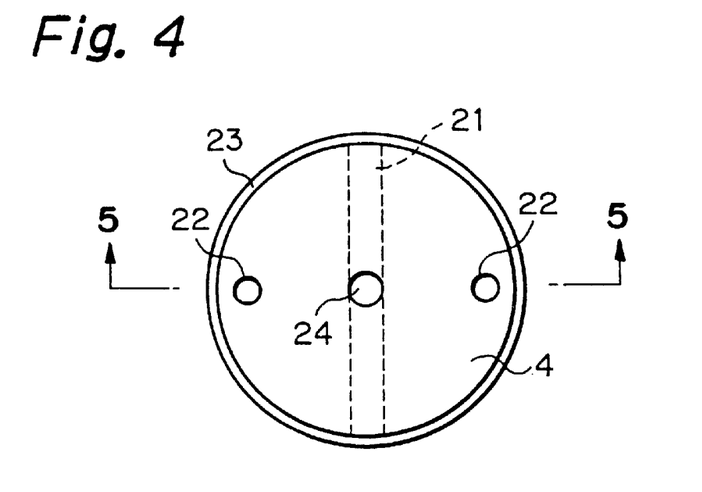
FIG. 4 is a plan view of a valve seat member used in the flow control valve of FIG. 1.
Figure 5:
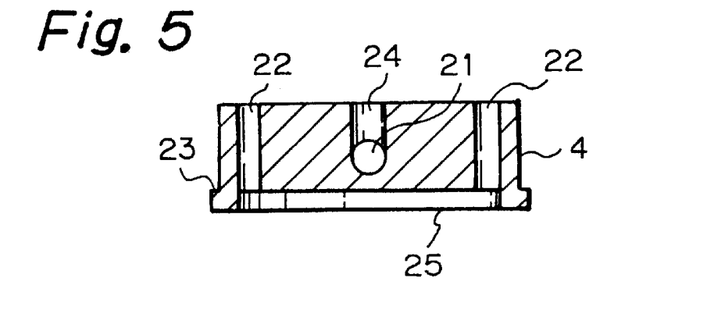
FIG. 5 is a cross-sectional view of the valve seat member taken along the line 5—5 of FIG. 4.
Figure 6:
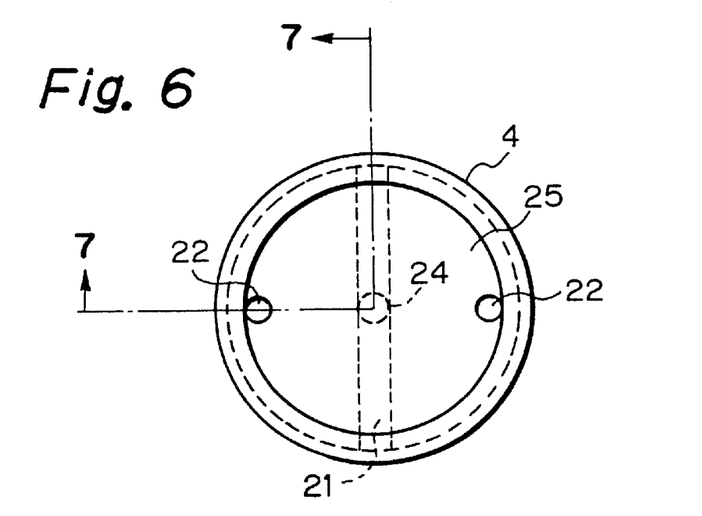
FIG. 6 is a bottom view of the valve seat member of FIG. 4.

A hole of cylindrical shape is formed in the upper surface of the base 1 at the central portion thereof, and extends downwardly, this hole defining the valve chamber. A valve seat member 4 and a valve member 5 are mounted in this hole. Details of the valve member 5 are shown in FIGS. 2 and 3, and details of the valve seat member 4 are shown in FIGS. 4, 5 and 6. More specifically, a projection 35 is formed on an upper surface of the valve member 5, and is disposed in vertical registry with the projection formed on the lower surface of the lower buffer member 16B. A lower portion of the valve member 5 is smaller in diameter than an upper portion thereof, and because of this diameter difference, a flange 36 is formed on the valve member 5. A hole or recess 33 of a relatively large area is formed in a lower or bottom surface of the valve member 5 at a central portion thereof, and a spring 6 is mounted in this hole 33. A ring-shaped projection 32 is formed on the lower surface of the valve member 5, and an inner peripheral surface of this ring-shaped projection 32 defines a peripheral surface of the hole 33. Another ring-shaped projection 34 is formed on the lower surface of the valve member 5, and is spaced a predetermined distance from the ring-shaped projection 32 in surrounding, concentric relation thereto. A ring-shaped groove 31 is formed between the two projections 32 and 34. The valve member 5 can be formed from a disk-shaped plate, in which case an outer peripheral portion of the disk-shaped plate is cut to form the flange 36, and upper and lower surfaces of the disk-shaped plate are cut to form the projection 35 and the ring-shaped projections 32 and 34.

The valve seat member 4 is in the form of a disk-shaped plate, and a lower end portion of the valve seat member 4 is larger in diameter than the remainder, that is, an upper portion thereof, so that a flange 23 is formed on the lower end portion. A lower surface of the valve seat member 4 is slightly hollowed out to provide a hole or recess 25 of a small depth. A pair of through holes 22 are formed through the valve seat member 4, and extend from the upper surface thereof to a peripheral portion of a base (upper) surface of the hole 25. Thus, the two through holes 22 extend in a direction of expansion and contraction (that is, a direction of driving) of the piezoelectric stack 13. A hole 21 is formed diametrically through the valve seat member 4, and is open at its opposite ends to the outer peripheral surface of the valve seat member 4, this hole 21 extending in a direction perpendicular to a line passing through the pair of through holes 22. A vertical or axial hole 24 is formed in the upper surface of the valve seat member 4 at a central portion thereof, and extends to the hole 21 to communicate therewith. When the valve member 5 and the valve seat member 4 abut against each other in the valve chamber, the flanges 23 and 36 cooperate with the inner peripheral surface of the valve chamber to form an annular gap or space 27 as shown in FIG. 1. The valve seat member 4 can be formed from a disk-shaped plate, in which case an outer peripheral surface of the disk-shaped plate is cut out to form the flange 23, and three holes are formed from an upper surface of the disk-shaped plate, and a hole is formed from the outer peripheral surface of the disk-shaped plate.

Figure 7:
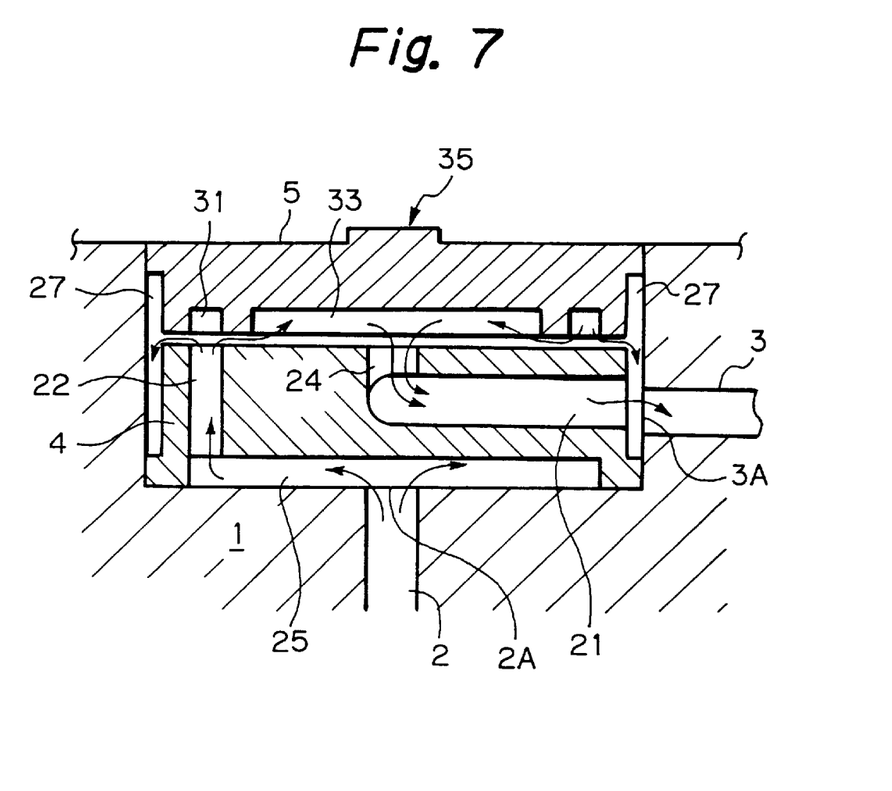
FIG. 7 is a cross-sectional view taken along the line 7—7 of FIG. 6, showing a valve chamber in the flow control valve of FIG. 1.

In the flow control valve of the above construction, the fluid flows as shown in FIG. 7. Reference is first made to an open condition of the valve. The fluid flows through the inflow passage 2 to an inlet port 2A of the valve chamber, and then reaches a gap between the opposed surfaces of the valve seat member 4 and the valve member 5 through the hole 25, formed in the lower surface of the valve seat member 4, and the axially-extending holes 22. Then, either directly from this gap or after impinging on the groove 31 opposed to the holes 22, firstly, the fluid flows out of an outlet port 3A via the annular gap 27, and secondly the fluid reaches the hole 33 in the lower surface of the valve member 5, and then flows through the hole 24, formed in the central portion of the valve seat member 4, and the diametrically-extending hole 21, and then flows out of the outlet port 3A (Part of the fluid may further flow in the annular gap 27).

In this embodiment, the fluid, having arrived at the inlet port 2A, is thus directed toward the outlet port 3A basically from the two directions, and this enables the control of a large flow rate. The two ring-shaped projections 32 and 34 are formed on the valve member 5, and the control of the large flow rate can be achieved by providing such simple configuration by a cutting operation. In the closed condition of the valve, the two ring-shaped projections 32 and 34 close the through holes 22 and the hole 24 to interrupt the above fluid flow passages.

Figure 8:
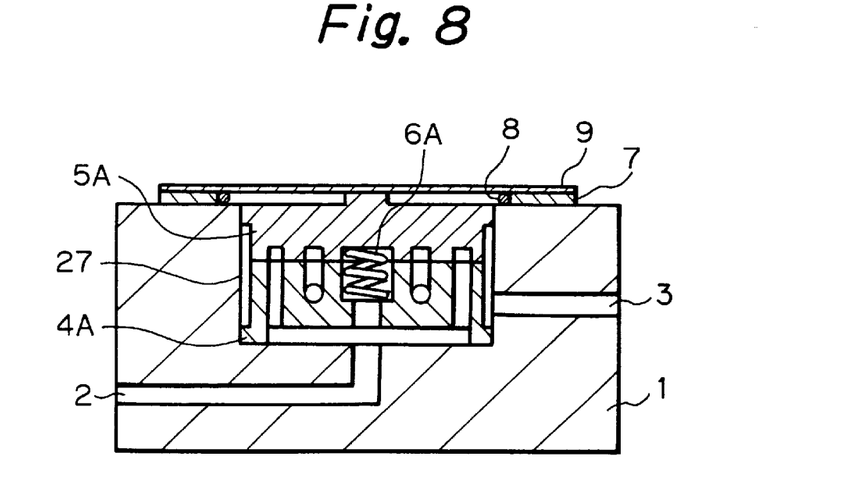
FIG. 8 is a cross-sectional view of an important portion of a second embodiment of a flow control valve of the invention.

FIG. 8 shows an important portion of a second embodiment of a flow control valve of the invention. Those parts (including the fixing ring 10 and so on) of FIG. 1 disposed above the diaphragm 9 (FIG. 1) are provided on a diaphragm 9 in FIG. 8. In this embodiment, a valve member 5A (best shown in FIG. 9) and a valve seat member 4A (best shown in FIGS. 10 and 11) are mounted in a valve chamber in a base 1, and a spring 6A is interposed between the valve member 5A and the valve seat member 4A.

Figure 9:
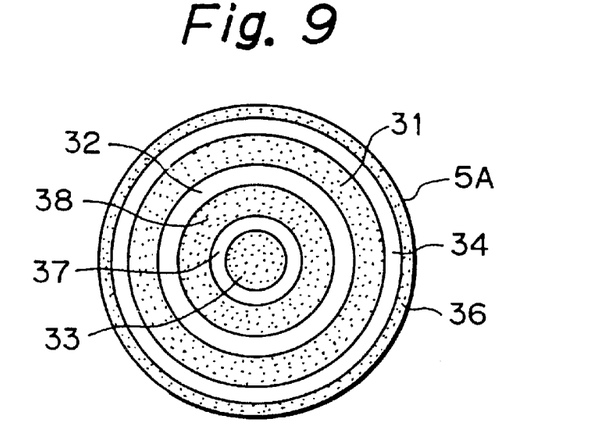
FIG. 9 is a bottom view of a valve member used in the flow control valve of FIG. 8.

More specifically, a circular hole 33 of a relatively small diameter with a closed bottom is formed by cutting in a central portion of a lower surface of the valve member 5A, and an annular groove 38 is formed in this lower surface by cutting in such a manner that a ring-shaped projection 37 is formed between the circular hole 33 and the annular groove 38. The other portions of the valve member 5A are similar to those of the valve member 5 of the first embodiment.

Figure 10:
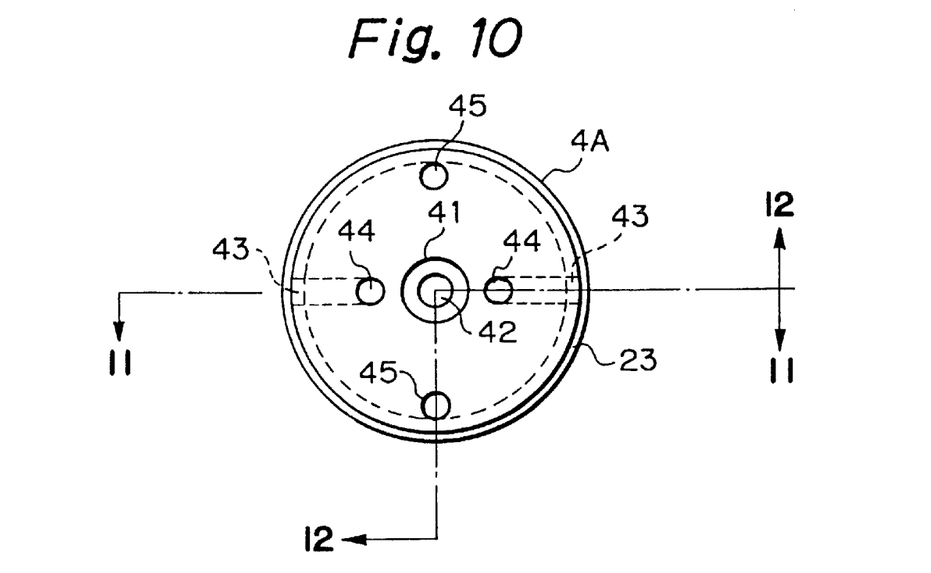
FIG. 10 is a plan view of a valve seat member used in the flow control valve of FIG. 8.
Figure 11:
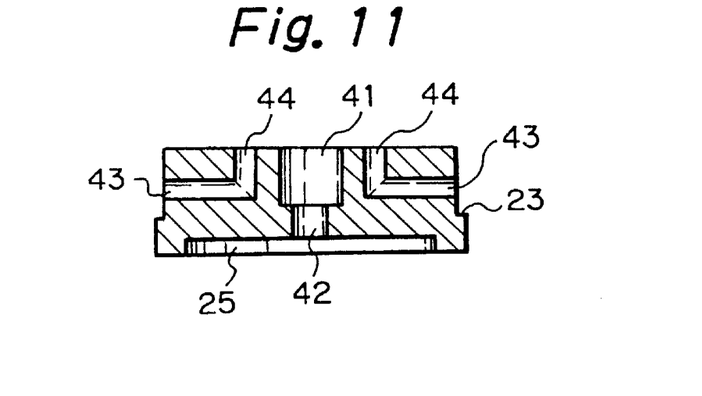
FIG. 11 is a cross-sectional view of the valve seat member taken along the line 11—11 of FIG. 10.

A through hole 42 is formed axially through a central portion of the valve seat member 4A from an upper surface thereof, and a hole 41 larger in diameter than the through hole 42 is further formed in this central portion to a predetermined length of depth. A pair of holes 43 are formed in diametrically-opposite portions of an outer peripheral surface of the valve seat member 4A, and radially extend a predetermined distance toward the center or axis of the valve seat member 4A. Further, a pair of holes 44 are formed in the upper surface of the valve seat member 4A perpendicularly to the holes 43, and extend respectively to inner ends of the pair of holes 43, so that the two holes 44 communicate with the two holes 43, respectively. A pair of through holes 45 are formed through the valve seat member 4A, and extend between the upper and lower surfaces thereof in a direction of expansion and contraction (driving) of the piezoelectric stack 13, the pair of holes 45 being disposed on a diametrical line perpendicular to a diametrical line passing through the pair of holes 44. A lower open end of each of the two holes 45 is disposed in contiguous relation to a peripheral surface of a hole or recess 25 of a small depth formed in the lower surface of the valve seat member 4A.

Figure 12:
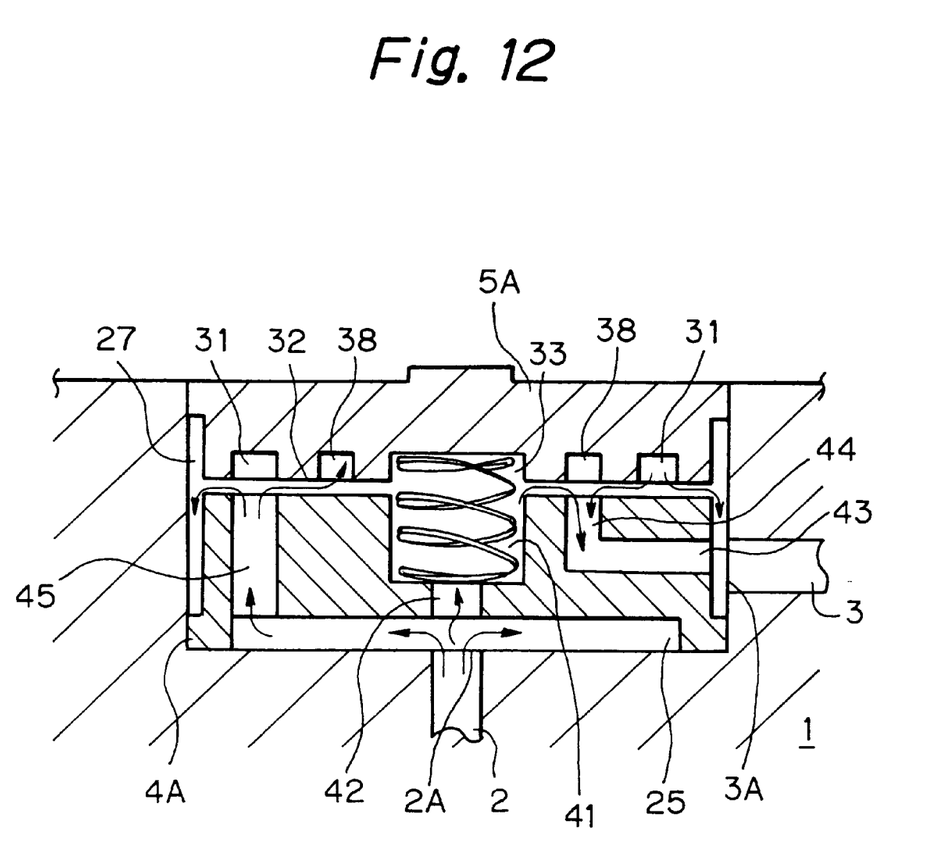
FIG. 12 is a cross-sectional view taken along the line 12—12 of FIG. 10, showing a valve chamber in the flow control valve of FIG. 8.

In the flow control valve of this embodiment, a fluid flows as shown in FIG. 12. Reference is first made to an open condition of the valve. The fluid flows through an inflow passage 2 to an inlet port 2A of the valve chamber, and then reaches a gap between the opposed surfaces of the valve seat member 4A and the valve member 5A through the hole 25, formed in the lower surface of the valve seat member 4A, and the axially-extending through holes 45. Then, either directly from this gap or after impinging on a groove 31 opposed to the through holes 45, firstly, the fluid flows out of an outlet port 3A via an annular gap 27, and secondly the fluid passes past a ring-shaped projection 32, formed on the lower surface of the valve member 5A, to reach the annular groove 38, and then flows along this annular groove 38, and further flows through the holes 44 and the radially-extending holes 43 in the valve seat member 4A, and then flows out from the inlet port 3A. Thirdly, the fluid, having arrived at the inlet port 2A, flows to the gap between the opposed surfaces of the valve seat member 4A and the valve member 5A through the hole 42 and the hole 41 (which are disposed immediately above the inlet port 2A), and then passes the ring-shaped projection 37, and further flows out from the outlet port 3A through the holes 44 and the radially-extending holes 43 in the valve seat member 4A.

In this embodiment, the fluid, having arrived at the inlet port 2A, is thus directed toward the outlet port 3A basically from the three directions, and this enables the control of a large flow rate. The three ring-shaped projections 32, 34 and 37 are formed on the valve member 5A, and the control of the large flow rate can be achieved by providing such simple configuration by a cutting operation. In the closed condition of the valve, the three ring-shaped projections 32, 34 and 37 close the through holes 45, the through hole 42 and the holes 44 to interrupt the above fluid flow passages.

Figure 13:
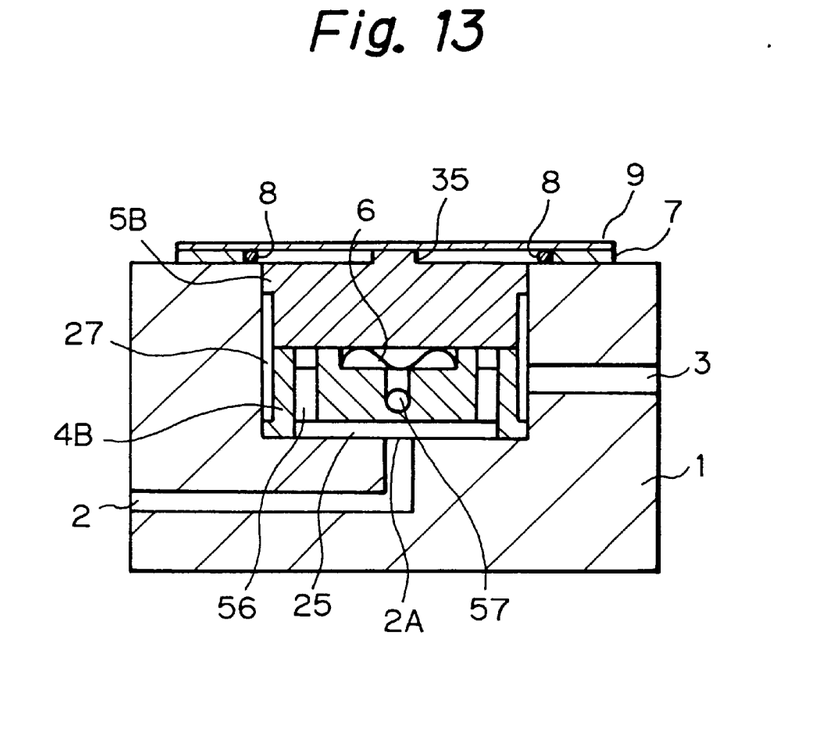
FIG. 13 is a cross-sectional view of an important portion of a third embodiment of a flow control valve of the invention.

FIG. 13 shows a third embodiment of a flow control valve of the invention. Those parts (including the fixing ring 10 and so on) of FIG. 1 disposed above the diaphragm 9 (FIG. 1) are provided on a diaphragm 9 in FIG. 13. In this embodiment, a valve member 5B has a flat lower surface which is finished, for example, into a mirror surface.

Figure 14:
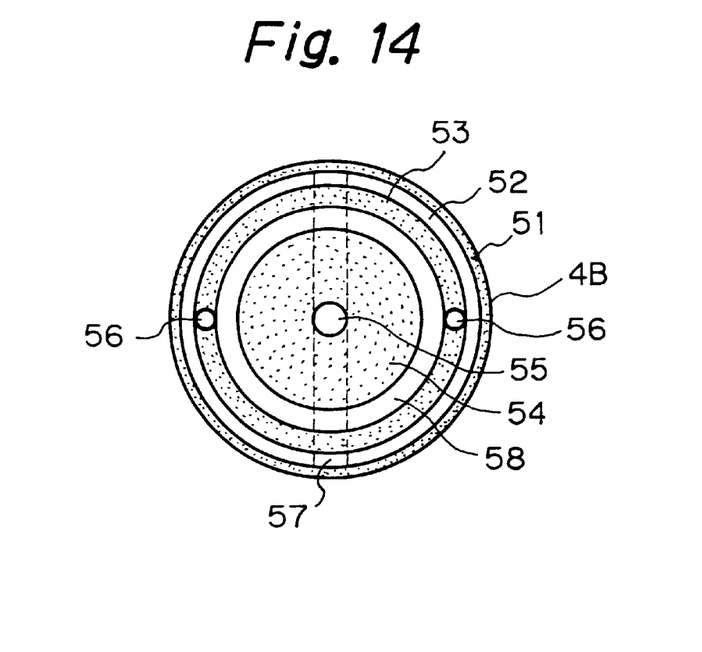
FIG. 14 is a plan view of a valve seat member used in the flow control valve of FIG. 13.

As shown in FIG. 14, a hole 57 is formed diametrically through a valve seat member 4B, and is open at its opposite ends to an outer peripheral surface of the valve seat member 4B. A hole 55 is formed axially in an upper surface of the valve seat member 4B at a central portion thereof, and extends to the hole 57. A hole or recess 54 of a relatively large diameter with a closed bottom is formed in the upper surface of the valve seat member 4B, and a ring-shaped projection 58 is formed on this upper surface in surrounding relation to the hole 54. Another ring-shaped projection 52 is also formed on the upper surface of the valve seat member 4B, and is spaced a predetermined distance from the ring-shaped projection 58 in concentric relation thereto. A flange 51 is formed on the outer peripheral portion of the valve seat member 4B, and an annular groove 53 is formed between the two ring-shaped projections 58 and 52. A pair of through holes 56 are formed through the valve seat member 4B in parallel relation to the axis thereof, and are disposed on a diametrical line perpendicular to the hole 57, the pair of through holes 56 being open at their upper ends to the annular groove 53.

In the flow control valve of this embodiment, a fluid flows through an inflow passage 2 to an inlet port 2A of a valve chamber, and then reaches a gap between the opposed surfaces of the valve seat member 4B and the valve member 5B through a hole 25, formed in the lower surface of the valve seat member 4B, and the axially-extending through holes 56. Then, from this gap, firstly, the fluid flows out of an outlet port 3A via an annular gap 27, and secondly the fluid reaches the hole 54 at the central portion of the valve seat member 4B, and flows into the axially-extending hole 55, and then flows out of the outlet port 3A via the diametrically-extending hole 57 (Part of the fluid may further flow along the annular gap 27).

In this embodiment, the fluid, having arrived at the inlet port 2A, is thus directed toward the outlet port 3a basically from the two directions, and this enables the control of a large flow rate. The lower surface of the valve member 5B is flat, and therefore the valve member 5B can be easily machined into the required configuration. The two ring-shaped projections 52 and 58 are formed on the valve seat member 4B, and the control of the large flow rate can be achieved by providing such simple configuration by a cutting operation.

Figure 15:
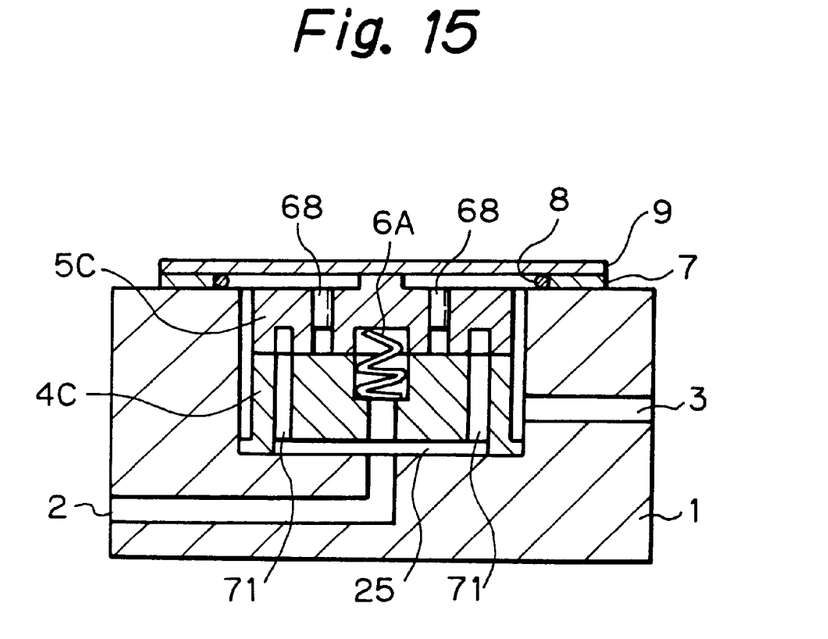
FIG. 15 is a cross-sectional view of an important portion of a fourth embodiment of a flow control valve of the invention.

FIG. 15 shows a fourth embodiment of a flow control valve of the invention. Those parts (including the fixing block 10 and so on) disposed above the diaphragm 9 (in FIG. 1) are provided on a diaphragm 9 in FIG. 15. In this embodiment, a valve member 5C (best shown in FIGS. 16 and 17) and a valve seat member 4C (best shown in FIGS. 18 and 19) are mounted in a valve chamber in a base 1, and a spring 6A is interposed between the valve member 5C and the valve seat member 4C.

Figure 16:
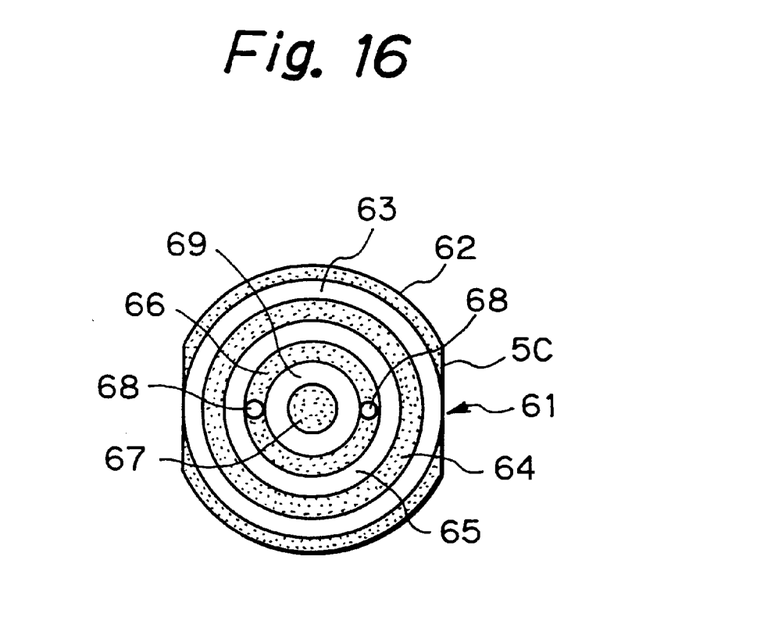
FIG. 16 is a bottom view of a valve member used in the flow control valve of FIG. 15.
Figure 17:
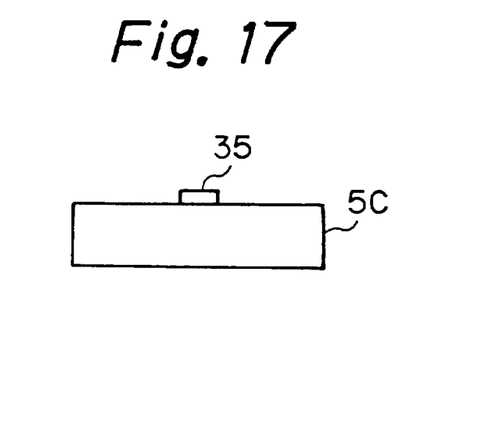
FIG. 17 is a side-elevational view of the valve member of FIG. 16.

A lower surface of the valve member 5C is cut at an outer peripheral portion thereof to form a flange 62, and two concentric, annular grooves 64 and 66 are formed in the lower surface of the valve member 5C by cutting, and a circular hole 67 of a relatively small diameter with a closed bottom is formed in a central portion of the lower surface of the valve member 5C by cutting. A pair of through holes 68 are formed through the valve member 5C in parallel relation to the axis thereof, and are disposed on a diametrical line passing through the axis of the valve member 5C, the pair of through holes 68 being open at their lower ends to the annular groove 66. A pair of diametrically-opposite portions of the outer peripheral portion of the disk-shaped valve member 5C are cut off to provide a pair of notches 61.

Figure 18:
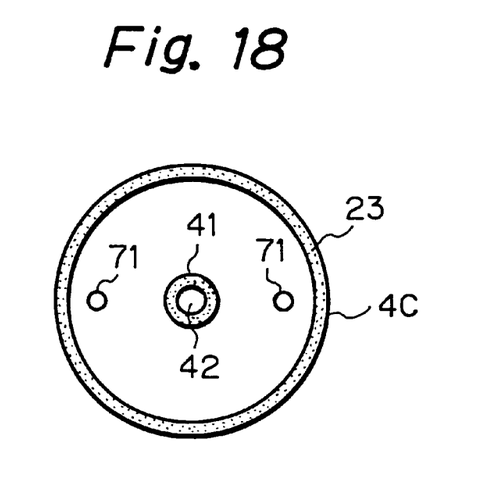
FIG. 18 is a plan view of a valve seat member used in the flow control valve of FIG. 15.
Figure 19:
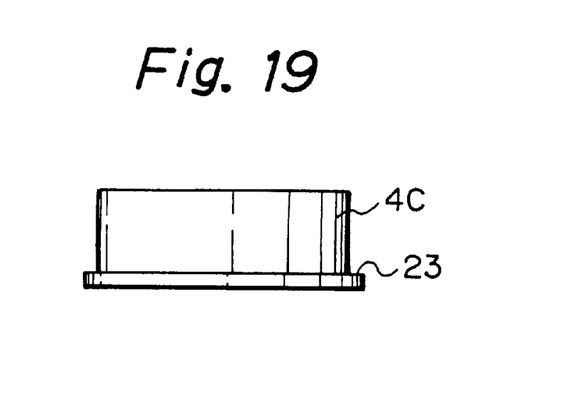
FIG. 19 is a side-elevational view of the valve seat member of FIG. 18.

A through hole 42 is formed axially through a central portion of the valve seat member 4C, and also a pair of through holes 71 are formed axially respectively through diametrically-opposite portions of the outer peripheral portion of the valve seat member 4C. The through hole 42 and the pair of through holes 71 are disposed on a common diametrical line passing through the axis of the valve seat member 4C. A hole 41 larger in diameter than the through hole 42 is further formed in the central portion of the upper surface of the valve seat member 4C to a predetermined depth. The pair of holes 71 are disposed in opposed relation to the annular groove 64 in the valve member 4C.

Figure 20:
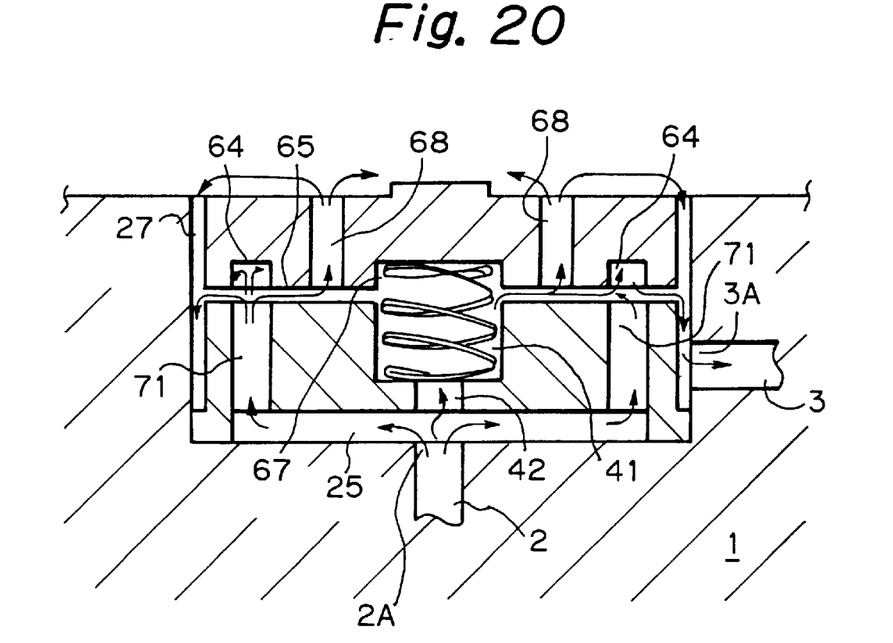
FIG. 20 is an enlarged view showing a valve chamber in the flow control valve of FIG. 15.

In the flow control valve of this embodiment, a fluid flows as shown in FIG. 20. Reference is first made to an open condition of the valve. The fluid flows through an inflow passage 2 to an inlet port 2A of the valve chamber, and further flows to a gap between opposed surfaces of the valve seat member 4C and the valve member 5C through a hole 25, formed in the lower surface of the valve seat member 4C, and the axially-extending through holes 71. From this gap, firstly, the fluid flows out of an outlet port 3A via an annular gap 27. Secondly the fluid passes past a ring-shaped projection 65 (formed on the lower surface of the valve member 5C) to reach the holes 68, and further flows to the upper surface of the valve member 5C, and then flows out of the outlet port 3A via the notches 62 and the annular gap 27. Thirdly, the fluid, having arrived at the inlet port 2A, flows to the gap between the opposed surfaces of the valve seat member 4C and the valve member 5C through the hole 42 and the hole 41, and then passes past a ring-shaped projection 69 (formed on the lower surface of the valve member 5C) to reach the holes 68, and further flows to the upper surface of the valve member 5C, and then flows out of the outlet port 3A via the notches 62 and the annular gap 27.

In this embodiment, the fluid, having arrived at the inlet port 2A, is directed toward the outlet port 3A basically from the three directions, and this enables the control of a large flow rate. The three ring-shaped projections 63, 65 and 69 are formed on the valve member 5C, and such control of a large flow rate can be achieved by providing the simple configuration by the cutting operation. The valve seat member 4C can be easily machined merely by drilling the axially-extending holes therein.

Figure 21:
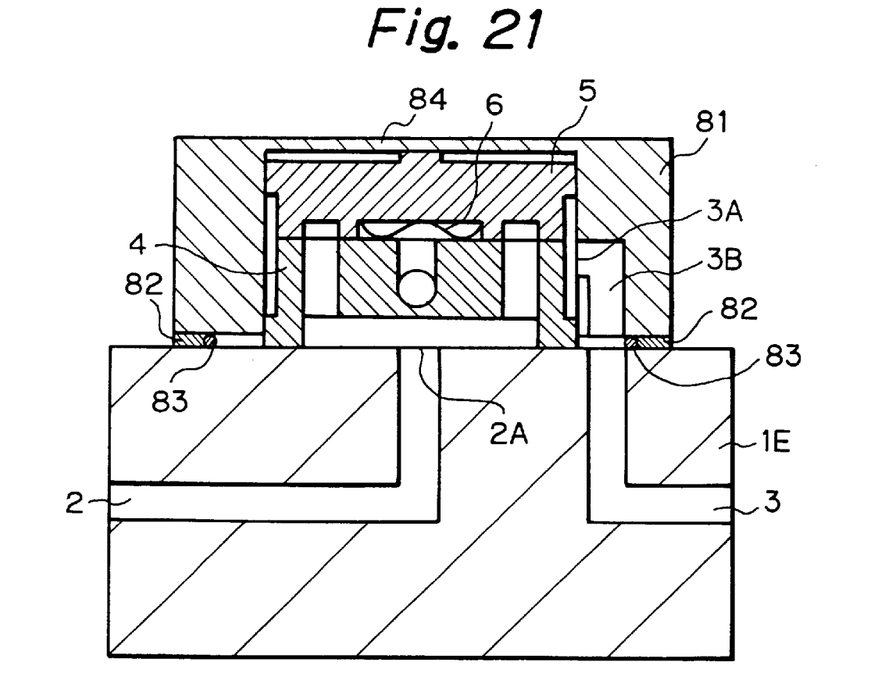
FIG. 21 is a cross-sectional view of an important portion of a fifth embodiment of a flow control valve of the invention.

FIG. 21 shows a fifth embodiment of a flow control valve of the invention. Unlike the above embodiments, in this embodiment, an inflow passage 2 and an outflow passage 3 are merely formed in a base 1E, and no hole serving as a valve chamber is formed in the base 1E. A valve chamber is formed by fixedly mounting a diaphragm member 81 of a tubular shape on an upper surface of the base 1E. More specifically, the diaphragm member 81 has a cylindrical tubular shape with a closed top, and includes a diaphragm portion 84 disposed at an actuator side, and a side or peripheral wall extending downwardly from an outer peripheral portion of the diaphragm portion 84 toward the base 1E. An outlet port 3A is formed in an inner surface of the side wall of the diaphragm member 81, and is disposed in a direction perpendicular to a direction of driving of a valve member 5. The outlet port 3A is connected to a discharge passage 3B formed vertically (FIG. 21) in the side wall of the diaphragm member 81, the discharge passage 3B extending in vertical registry with an inlet end of the outflow passage 3 in the base 1E.

An O-ring 83 is interposed between the diaphragm member 81 and the base 1E, and is held in position by an O-ring guide 82. The valve chamber is formed by an internal space of the diaphragm member 81, and more strictly the valve chamber is defined by the diaphragm member 81 and the base 1E. The valve member 5, a valve seat member 4 and a spring 6, which are identical respectively to the corresponding parts in the first embodiment, are mounted in the valve chamber. A fluid flows in the valve chamber in a manner as described above for the first embodiment. Those parts (including the fixing ring 10 and so on) of FIG. 1 disposed above the diaphragm 9 (FIG. 1) are provided on the diaphragm member 81 in FIG. 21.

In this embodiment, no hole serving as the valve chamber is formed in the base 1E, and even in this construction, the valve chamber capable of providing the required flow passages can be suitably formed by applying necessary processings to the diaphragm member 81. Incidentally, any of the combinations of the valve member and the valve seat described in the above second to fourth embodiments can be mounted in the valve chamber in the flow control valve of this embodiment.

In the above embodiments, although the piezoelectric actuator is used, the present invention can be applied to any other suitable actuator.

As described above, in the flow control valve of one aspect of the invention the valve seat member has at least a first hole formed therethrough and extending in the direction of driving of the valve member, at least a second hole formed therein and extending from the outer peripheral surface thereof, and a third hole which is separated from the first hole and extends from its surface facing the valve member to the second hole in a direction of driving of the valve member, the second hole extending in a direction substantially perpendicular to the direction of driving of the valve member. A gap is provided in the valve chamber, so that when the valve member is disengaged from the valve seat member, there are formed the first flow passage, through which the fluid flows from the inlet port to the outlet port via the first hole, and the second flow passage through which the fluid flows from the inlet port to the outlet port via the first, third and second holes. With this construction, the control of the valve having a large flow rate can be achieved. Besides, in order to form these flow passages, it is only necessary to form the holes and the gap, and therefore the machining of the parts is easy, and closure of the valve can be obtained without the need for any complicated construction, and the working life of the valve is long.

As described above, in the flow control valve of a further aspect of the projections are provided on the opposing surface of the valve member and/or the valve seat member. In the case that the projections are provided both on the opposing surfaces of the valve member and the valve seat member, when the valve is closed the projections abut against each other to interrupt the communication between the first hole and the third hole. In the case that the projections are provided on the surface of the valve member or the valve seat member, when the valve is closed the projections abut against the facing surface of the valve member or the valve seat member to interrupt the communication between the first hole and the third hole. With this construction, the closure of the valve can be obtained without the need for any complicated construction, and a large flow rate can be achieved even in a short stroke of the actuator.

As described above, in a flow control valve of a further aspect of the present invention, the surface of the valve member facing the valve seat member is flat. Even with this simple construction and with the easy machining, a large flow rate can be achieved when the valve is open.

As described above, in the flow control valve of a further aspect of the invention the valve seat member has at least a through hole formed therethrough and extending in the direction of driving of the valve member, and the valve member has at least a through hole formed therethrough and extending in the direction of driving of the valve member. The gap is provided in the valve chamber, so that when the valve member is disengaged from the valve seat member, there are formed the flow passage, through which the fluid flows from the inlet port to the outlet port via the through hole in the valve seat member, and the other flow passage through which the fluid flows from the inlet port to the outlet port via the through hole in the valve seat member and the through hole in the valve member. With this construction, control of the valve having a large flow rate can be achieved. Besides, the flow passages are provided mainly by forming the through holes, and therefore the machining of the parts is easy,. and closure of the valve can be obtained without the need for any complicated construction, and the working life of the valve is long.

As described above, in the flow control valve of a further aspect of the invention projections are formed on the opposing surfaces of the valve seat member and/or the valve member, and the projections interrupt the communication between the through hole in the valve seat member and the through hole in the valve member when the valve is closed, and the fluid flows past this projection when the valve is open. With this simple construction, open and close control of the valve comprising two flow passages can be achieved.

As described above, in the flow control valve of another aspect of the invention, there is provided a diaphragm member which includes the diaphragm portion disposed at the actuator side, and the side wall extending from the outer peripheral portion of the diaphragm portion. In this construction, the space defining the valve chamber can be easily provided by the diaphragm member.

As described above, in the flow control valve of another aspect of the invention, the outlet port is provided in the direction substantially perpendicular to the direction of driving of the valve member. The outer port is thus provided in the direction perpendicular to the direction of movement of the valve member or the valve seat member, so that the fluid can easily flow out of the outlet port through the outer periphery of the valve member or the valve seat member.

What is claimed is:

1. A flow control valve comprising:
    a valve chamber having an inlet port through which fluid flows into said valve chamber and an outlet port through which fluid flows from said valve chamber;
    a valve member mounted in said valve chamber and slidable therein in response to a driving force applied from an actuator;
    a valve seat member mounted in said valve chamber in opposed relation to said valve member and cooperating therewith to control a rate of flow of the fluid;
    said valve member having therethrough at least one through hole extending in the direction of driving of said valve member, and said valve member having a spring support recess formed in the center of a side thereof confronting said valve seat member;
    said valve seat member having therethrough a first through hole in communication with said spring support recess, and said valve seat member having extending therethrough at least one second through hole extending in said direction of driving of said valve member;
    a spring interposed between said valve seat member and said valve member and fitting in said spring support recess; and
    said valve chamber having therein a gap so that when said valve member is disengaged from said valve seat member there are formed a first flow passage, through which the fluid flows from said inlet port to said outlet port via said at least one second through hole in said valve seat member, and a second flow passage, through which the fluid flows from said inlet port to said outlet port via said at least one second through hole in said valve seat member and said at least one through hole in said valve member.

2. A flow control valve as claimed in claim 1, further comprising projections formed on at least one of said valve member and said valve seat member and confronting the other of said valve member and said valve seat member, a first said projection interrupting communication between said at least one second through hole in said valve seat member and said at least one through hole in said valve member in a closed condition of said valve.

3. A flow control valve as claimed in claim 2, wherein, when said valve member is disengaged from said valve seat member, a third flow passage is formed, through which the fluid flows from said inlet port to said outlet port via said first through hole in said valve seat member and said at least one through hole in said valve member, and a second said projection interrupting communication between said first through hole in said valve seat member and said at least one through hole in said valve member in said closed condition of said valve.

4. A flow control valve as claimed in claim 3, wherein said projections are formed on said valve member, and said at least one through hole in said valve member is positioned between said first and second projections.

5. A flow control valve as claimed in claim 2, wherein said projections are formed on said valve member.

6. A flow control valve as claimed in claim 1, wherein, when said valve member is disengaged from said valve seat member, a third flow passage is formed, through which the fluid flows from said inlet port to said outlet port via said first through hole in said valve seat member and said at least one through hole in said valve member.

7. A flow control valve as claimed in claim 1, further comprising a diaphragm member including a diaphragm portion disposed at an actuator side and a side wall extending from an outer peripheral portion of said diaphragm portion, said valve chamber being formed in said diaphragm member.

8. A flow control valve as claimed in claim 1, wherein said outlet port extends in a direction substantially perpendicular to said direction of driving of said valve member.

9. A flow control valve as claimed in claim 1, wherein said first through hole in said valve seat member has a widened end facing said spring support recess in said valve member, and said spring fits in said widened end.

10. A flow control valve as claimed in claim 1, wherein said valve member has at a side thereof opposite said valve seat member an outwardly extending flange sliding in said valve chamber, a portion of said flange being removed to form a notch.

* * * * *